Dec. 3, 1963 R. W. GRAHAM 3,112,939
THREADLESS TUBING CONNECTOR
Filed March 21, 1960

INVENTOR.
Robert W. Graham
BY
ATTORNEY

United States Patent Office 3,112,939
Patented Dec. 3, 1963

3,112,939
THREADLESS TUBING CONNECTOR
Robert W. Graham, Birmingham, Mich., assignor to General Motors Corporation, Detroit, Mich., a corporation of Delaware
Filed Mar. 21, 1960, Ser. No. 16,522
2 Claims. (Cl. 285—238)

This invention relates to coupling devices and more particularly to an economical threadless assembly for expediting the fluid-tight coupling of small diameter tubing into a high pressure fluid system such as is involved in a vehicle air suspension system.

Of major importance in the development of a commerially feasible passenger car air suspension system is the problem of making the system sufficiently economical to enhance buyer acceptance.

Among the principal reasons why the initially introduced modern air suspension systems on American passenger cars failed to achieve commercial success are high installation cost as well as the high cost of repairing the system in the event of failure. Thus, extensive developmental efforts have been devoted to reduce the cost of existing systems apart from improving the function thereof.

Since the self-leveling passenger car air suspension system involves a complex network of interrelated high pressure air lines, a vast number of air line connections are required. Thus, a reduction in cost in the area of air lines and tube fittings both from an installation and replacement standpoint is a major consideration in the development of a commercially suuccessful passenger car air suspension system.

Although in the initial development of air suspension systems tubing of rather large diameter was used, that is, about ¼ inch or larger, it has now become known that tubing of much smaller diameter can be employed in existing systems. Moreover, although metal tubing was initially used, it was found that plastic tubing of the extremely small diameter of about ⅛ inch, having a wall thickness of about 0.03 inch, could satisfactorily be used in place of the larger diameter metal tubing.

High pressure fluid systems, such as air suspension systems for passenger cars generally involve line pressures of about 250 p.s.i. to 350 p.s.i. Air systems on commercial vehicles, such as trucks and buses, involve line pressures of at least about 90 p.s.i. The many air line connections made in such systems must be sufficiently strong enough to not only withstand the high pressures but also sufficiently air-tight to withstand even a very small degree of incipient leakage that might occur. Frequently a vehicle remains idle for extended periods of time. Even a small degree of incipient leakage at each of the numerous air line connections in an air suspension system can cause a pressure failure during this period.

It is therefore of utmost importance that the air line connections not only be strong enough to withstand the pressures involved but sufficiently air-tight to resist even a small degree of incipient leakage. Threaded tube fittings have been used for many years to make tube connections which would be satisfactory under such circumstances. With the advent of small diameter plastic tubing in high pressure fluid systems, such as air suspension systems, it was generally assumed that threaded fittings would be required. Moreover, with the critical problem of incipient leakage being present in an air suspension system, it was even more firmly believed that an especially air-tight threaded fitting would be required.

Typical means for coupling the plastic or metal tubing into the high pressure air system generally involved threaded connectors which were often elaborate, requiring a large number of man hours to assemble a complete system. A connector for plastic tubing, for example, involved forming a threaded opening in a coupling member to which the tubing is to be joined, placing a threaded male connector sleeve on the tubing, molding a resilient seal material to the outer diameter of the end of the tubing, placing that end into the opening in the coupling member, and then compressing the resilient seal material between the coupling member and the connector sleeve by tightening the latter two together. Of course, when such a connection is made at both ends of a length of plastic tubing, two sleeve members must be first slipped onto the nylon tubing before the resilient seals are molded onto the tubing. This tubing is then useful only for a specific application in which the desired length can be used.

The above type of connector, of course, still involves the relatively costly threaded fittings which are so labor-consuming in assembly. Another disadvantage of the above-described, previously used nylon tubing connectors is that expensive molding equipment is required to make such a connection. The average supplier of replacement parts has neither the inclination nor financial ability to invest in and use such equipment. Thus, suppliers of replacement parts would be required to stock each and every separate length which would be used in an air suspension system.

It is an object of this invention to provide a threadless tubing connector which avoids the previously described disadvantages of connectors heretofore used for coupling small diameter tubing into a high pressure fluid system, such as a vehicle air suspension system.

Other objects, features and advantages of the invention will appear more clearly from the following description of preferred embodiments thereof and from the drawing, in which.

The objects of my invention are attained by imperforately securing a small diameter tubing within a bore of a plug member which is in frictional engagement with the inner surface within a coupling member. A peripheral external sealing means on the member provides an imperforate seal between the inner surface of the coupling member and the plug member.

I have unexpectedly found that a threadless connection made in accordance with my invention is strong enough to withstand line pressures up to 1200 p.s.i. Moreover, my coupling assembly is also resistant to incipient leakage with line pressures up to 500 p.s.i. Although my invention can obviously be used in coupling assemblies for all sizes of tubing, such a coupling of a large diameter tubing is not satisfactory for a high pressure fluid system. I have unexpectedly found that when such a coupling assembly is used with a small diameter tubing, it can not only withstand extremely high pressures with a reasonable safety factor but will also resist incipient leakage at least as well as a threaded fitting.

Such a coupling, when used on large diameter tubing will not withstand such pressures and resist incipient leakage as well as a threaded fitting. My invention can be satisfactorily used to couple ¼ inch tubing into a fluid system having line pressures in excess of about 90 p.s.i. However, my coupling assembly is especially suitable for coupling small diameter tubing into such systems.

Figure 1:
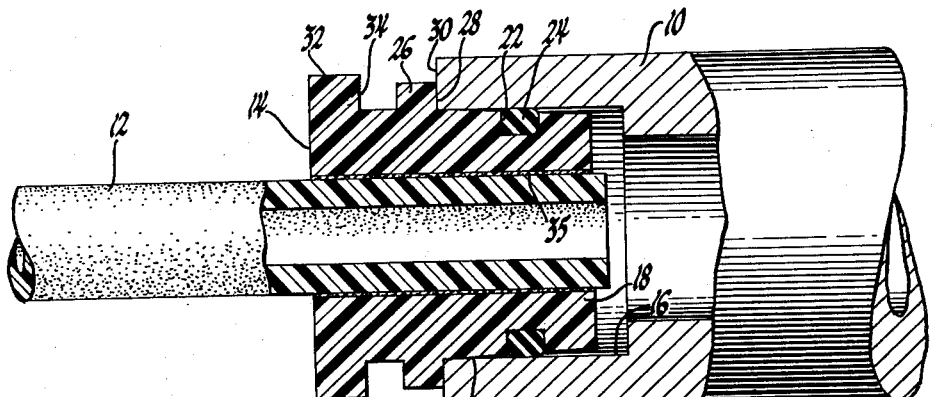
FIGURE 1 is a fragmentary elevational view in partial section showing an assembly for coupling nylon tubing such as contemplated by my invention.
Figure 2:
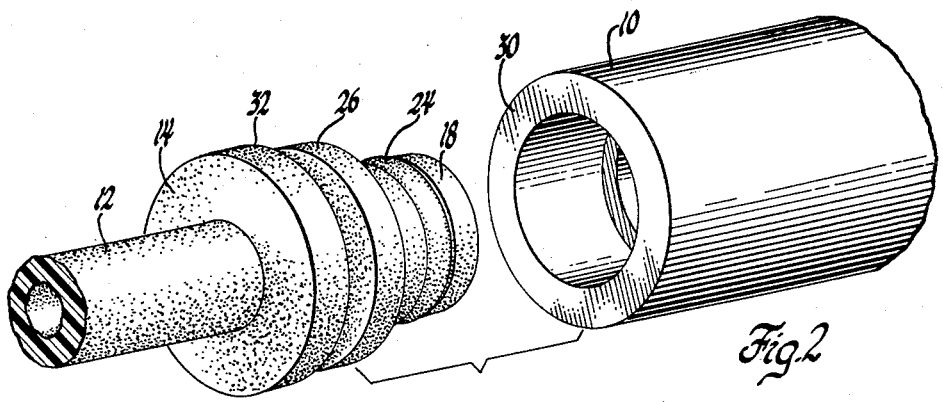
FIGURE 2 is an elevational view in perspective showing the separate parts of the assembly shown in FIGURE 1.

The coupling assembly of my invention is best described in connection with the drawing. FIGURES 1 and 2 show an assembly such as encompassed by my invention. The assembly includes a generally tubular coupling member 10 which is in communication with a high pressure fluid system (not shown), a length of nylon tubing 12 and a plug member 14. The tubular coupling member 10 has an inner surface 16 defining a generally cylindrical bore which leads to the high pressure fluid system. The bore is preferably not larger than twice the diameter of the tubing which is being coupled. The plug member 14 is generally tubular and has a tapered portion 18 thereof projecting within an opening in the coupling member 10 and in frictional engagement with the inner surface 16 at 20.

The plug member has a circumferential groove 22 in the tapered portion 18 thereof and has an O-ring 24, of rubber or the like, disposed therein. The O-ring is compressed radially inwardly throughout its circumference by the inner surface 16 of the coupling member 10 to provide a seal between the surface 16 and the plug 14. A circumferential projection 26 on the plug member forms a shoulder 28 which abuts the end surface 30 of the coupling member 10 limiting the degree of extension of the plug member within the coupling member. A second circumferential projection 32 on the plug member axially spaced from the first projection forms a second shoulder 34. The shoulder 34 is provided as a means for engaging the plug 14 with a suitable tool to facilitate disassembly of the coupling member and plug.

The imperforate attachment of the tubing to the plug at 35 can be accomplished in a variety of way depending upon the nature of the materials of which they are formed. If both are metal, the tubing 12 and the plug 14 can be joined in a conventional manner, as by soldering, brazing or the like. For plastics, as well as for metals, suitable organic polymer adhesives can be used. However, to provide an even more durable, economical and rapid bond when coupling a plastic tubing, such as nylon, I prefer to also form the plug member of a plastic, such as nylon, and spin weld the two together. The spin welding can be accomplished in the manner generally understood in the art, as by spinning the plug member onto the tubing so as to generate enough frictional heat to fuse the two together at the surface areas.

Figure 3:
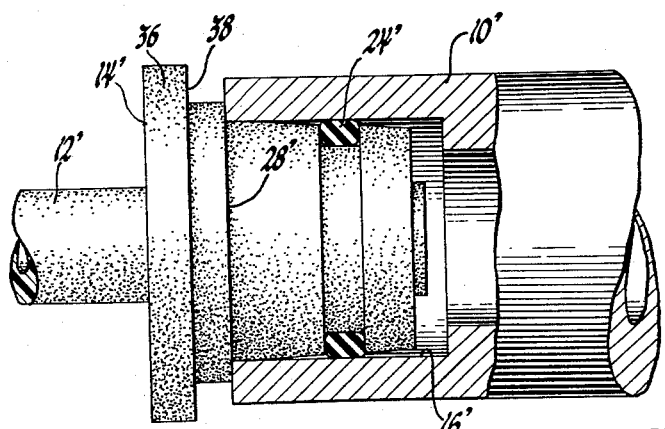
FIGURE 3 is an elevational view in partial section with parts broken away showing a modification of the assembly shown in FIGURE 1.

A modification of the above-described invention is shown in FIGURE 3. The coupling assembly shown in FIGURE 3 is essentially the same as that shown in FIGURE 1 differing only in the construction of the portion 36 of the plug member 14' which is disposed outside the coupling member 10'. This modification of the invention includes an outer shoulder 38 which is concentric rather than in register with the adjacent shoulder 40 which limits the extension of the plug in the coupling member.

Although I have described my invention in connection with certain specific examples thereof, no limitation is intended thereby except as defined in the appended claims.

I claim:

1. In a vehicle air suspension system an economical assembly for expediting the connection and air-tight sealing of tubing having an outer diameter of approximately ⅛–¼ inch into an air system which is under a pressure of at least about 90 p.s.i., said assembly comprising a coupling member having a generally cylindrical opening therein of approximately twice the tubing diameter in communication with said air system, said opening being defined by an inner surface, a generally cylindrical plug member having a tapered portion thereof projecting entirely within said cylindrical opening and being held therein solely by frictional engagement with said surface, a circumferential groove on the tapered portion of said plug, an annular resilient sealing member disposed within said groove in mutual contact with said plug member and said inner surface forming an interjacent air-tight seal, a first circumferential shoulder on said plug member engaging an end surface of said coupling member for limiting the extension of said plug member within said opening, a second circumferential shoulder on said plug outside said opening to facilitate removal of said plug member from said opening, a bore axially extending through said plug member and one end of a length of tubing having an outer diameter of about ⅛–¼ inch imperforately bonded within said bore.

2. The assembly defined by claim 1 in which the plug member and the tubing are formed of nylon and the imperforate bond therebetween is formed by spin welding.

References Cited in the file of this patent

UNITED STATES PATENTS

| | | |
|---|---|---|
| 1,316,116 | Spain | Sept. 16, 1919 |
| 2,498,831 | Veitch | Feb. 28, 1950 |
| 2,521,127 | Price | Sept. 5, 1950 |
| 2,537,232 | Nottingham | Jan. 9, 1951 |
| 2,785,911 | Kaufman | Mar. 19, 1957 |
| 2,933,428 | Mueller | Apr. 19, 1960 |

FOREIGN PATENTS

| | | |
|---|---|---|
| 487,244 | Italy | Nov. 27, 1953 |